Patented Dec. 4, 1945

2,390,190

UNITED STATES PATENT OFFICE 2,390,190

CHEMICAL PROCESS AND PRODUCT

Frank J. Soday, Swarthmore, Pa., assignor to The United Gas Improvement Company, a corporation of Pennsylvania No Drawing. Application May 23, 1942, Serial No. 444,255

8 Claims. (Cl. 154—28)

The present invention relates to a novel mineral fiber product and to the method of making the same.

More particularly, it relates to a product comprising synthetic or artificial mineral fibers coated with a resin derived by the polymerization, either by thermal and/or catalytic methods, of the high boiling monomeric hydrocarbon material separated in monomeric form from tar formed during the production of combustible gas by processes involving the pyrolytic decomposition of petroleum oil with or without the aid of catalysts, said resin preferably being applied in the form of an aqueous emulsion.

It is to be understood, of course, that solutions of resins of the type described herein in organic, and more particularly hydrocarbon, solvents may be used in place of the corresponding aqueous resin emulsions. However, I prefer to employ aqueous emulsions of the type described for this purpose.

While the present invention is applicable for the treatment of any mineral fiber, for example asbestos, it is of particular advantage in the treatment of synthetic or artificial mineral fibers, such as glass fibers; mineral, slag or rock wool; quartz and other siliceous fibers, where the problem of abrasion is encountered. Since difficulties, due to abrasion, are accentuated in the case of glass fibers, the invention will be described using glass fibers as illustrative of the various mineral fibrous materials which may be treated in accordance herewith.

It has been found that individual glass fibers initially produced possess excellent mechanical properties, but glass is not a stable material in the solid state, as it is in reality a super-cooled liquid; consequently, any abrasion suffered by the glass fibers results in a very marked decrease in their mechanical strength. For example, if one fiber is drawn across the surface of a second glass fiber, or comes in contact with another surface, such as a metal or ceramic surface, the surface of the fiber is abraded with the formation of minute microscopic surface cracks or pits. Since the glass fiber is under considerable internal strain, these cracks or abrasions locally weaken the external surface of the glass fibers sufficiently to permit such strains to be relieved destructively when the fiber is subsequently subjected to mechanical stresses, resulting in the fracture or disintegration of the fiber. Tests have indicated that the mechanical strength and resistance to distortion of typical glass fibers may be reduced approximately 90% by abrasion, regardless of the size of the area abraded or the depth or extent of the abrasion.

This difficulty, due to abrasion, is a serious problem in products fabricated from glass fibers, such as woven, felted or other articles. Thus, glass fiber batts for insulating purposes are prepared by forming a loose mat or felt of the desired shape from glass fibers and these depend for their insulating efficiency on the formation of dead air spaces or pockets within the interior of the batt by the meshed fibers of which it is constructed. Since air is excellent insulating medium, such batts possess very good insulating properties. However, it has been found that batts of this type suffer a serious loss of insulating efficiency during storage, shipment, and installation, as they are readily crushed, resulting in a marked decrease in the number and size of the air spaces or pockets present in a given unit. The same difficulties are present in insulating batts made from mineral, slag, and/or rock wool; and in woven fabrics made of synthetic mineral fibers the destruction of the usefulness of the fabric due to abrasion is also encountered.

A principal object of the present invention is to provide mineral fibers coated by an aqueous petroleum oil gas tar resin emulsion, so that the fibers become coated or encased in a sheath of said resin, thereby effectively protecting the fibers from abrasion.

A further object of the invention is to provide synthetic mineral fibers and products fabricated therefrom which will withstand storage, shipment, installation and use without substantial loss of strength or of the other desirable properties of the mineral fibers.

Still another object of the present invention is to furnish synthetic mineral fiber batts for insulating purposes which possess unusual resiliency, due to the elastic nature of the coating of the fibers, which coating further tends to protect the material from deterioration due to external mechanical stresses, and enables the mass to regain its original shape upon distortion.

Other objects, including the provision of a novel and economical method of preparing the products hereinbefore described, will be apparent from a consideration of the specification and claims.

Individual mineral fibers may be treated with an aqueous petroleum oil gas tar resin emulsion in accordance with the present invention and thereafter formed into any desired fabricated product; or products, such as woven, felted, or other formed articles fabricated from mineral fibers may be treated with the emulsion. Herein, where the term "mineral fiber" or "synthetic mineral fiber" is used without qualification, it includes the fabricated product as well as the individual fibers, and the term "fabricated product" includes products made by weaving, felting, or otherwise manipulating the mineral fibers to form an article or product.

The aqueous resin emulsions employed in the treatment of the mineral fibers, in accordance with the present invention, are described and claimed in copending application Serial Number 433,333, filed March 4, 1942, and the disclosure of that application is included herein by reference.

As pointed out in said copending application, the resinous polymers employed in the preparation of the said aqueous emulsions may be obtained by the thermal and/or catalytic polymerization of the unsaturated monomeric material boiling within the range of from 210° to 350° C. and separated in monomeric form from the higher boiling pitch constituents of tar formed during the production of gas by processes involving the pyrolytic decomposition of petroleum oil, either with or without the aid of catalysts.

The hydrocarbon constituents of such petroleum tar have usually been considered to comprise residual tar, dead oil, and light oil. The residual tar comprises the heavy black pitch constituents of the tar together with any oil unseparated therefrom. The dead oil comprises oil separated from the residual tar and boiling higher than say 200–210° C. The light oil comprises oil separated from residual tar and boiling lower than say 200–210° C.

It has been discovered that very considerable quantities of such resin forming unsaturated monomeric material above referred to, including large quantities of readily heat polymerizable material, may be contained in the tar produced in the vapor phase pyrolysis of crude petroleum oil or a fraction or fractions thereof such as for example gas oil or residuum oil. This is particularly so in the case of petroleum oil gas tar produced when the pyrolysis is conducted at relatively high temperatures, such for example as in the manufacture of oil gas or carburetted water gas at average set temperatures above 1300° F. and also particularly so when the oil pyrolyzed is naphthenic, such as a crude oil classifiable in classes 5 to 7 inclusive, according to the method of classification described in Bureau of Mines Bulletin 291 as modified by Bureau of Mines Report of Investigations 3279, or a fraction or fractions of such an oil.

The possibility of recovering large quantities of resin forming monomeric unsaturated material boiling in the dead oil range was long unrealized. This was because the usual distillation procedures for the purpose of petroleum tar dehydration and/or tar fractionation were such as to polymerize the readily heat polymerizable monomers boiling in the dead oil range into heavy polymers, which were inextricably mixed with the heavy black residual pitch constituents and lost therein.

In copending application Serial Number 370,608, filed December 18, 1940, by Edwin L. Hall and Howard R. Batchelder, such heat polymerizable monomeric hydrocarbons boiling in the range of from 210 to 350° C. and separated from the heavy black pitch constituents of the petroleum tar are described and claimed, together with heat polymers produced therefrom.

In copending application 386,232, filed April 1, 1941, by Waldo C. Ault, there is described and claimed the production of catalytic resins from the heat polymerizable and/or catalytically polymerizable monomeric hydrocarbons boiling within the range of from 210° C. and 350° C. and separated in monomeric form from the heavy black pitch constituents of the petroleum tar.

In the manufacture of oil gas and carburetted water gas, the tar produced is usually in the form of an emulsion due to the condensation of hydrocarbon constituents from the gas in the presence of water simultaneously condensed from the gas or otherwise present.

In copending application 342,735, filed June 27, 1940, by Edwin L. Hall and Howard R. Batchelder, there is described a method of dehydrating such petroleum tar emulsions and of fractionating the hydrocarbon constituents thereof by rapid distillation, with the separation from the heavy pitch constituents of residual tar of such heat polymerizable unsaturated monomeric hydrocarbons boiling in the dead oil range.

In copending application 353,034, filed August 17, 1940, by Howard R. Batchelder, there is described the dehydration of such petroleum tar emulsions and the fractionation of the hydrocarbon constituents thereof with the recovery of monomeric unsaturated heat polymerizable dead oil constituents separate from the heavy black pitch constituents of residual tar, by the solvent extraction of the emulsion with a hydrocarbon solvent such as liquefied propane or butane.

Other processes, for example fractional condensation, might be employed to recover these relatively high boiling unsaturated hydrocarbons in monomeric form and separate from the heavy black pitch constituents of the tar. Also processes for oil pyrolysis which avoid the formation of emulsions, may be employed for the production of the monomeric material. Furthermore, while it may be preferred to employ petroleum oils or cuts therefrom, which are classifiable in classes 5 to 7 inclusive according to Bureau of Mines Bulletin 291 as modified by Bureau of Mines Report of Investigations 3279 and particularly in class 7, other oils may be employed.

Whatever process of oil pyrolysis is employed in the production of this monomeric material and whatever process is employed for separating the resultant tar, a very important factor is the exercise of care in the treatment of the tar in order to avoid excessive polymerization of these readily heat polymerizable dead oil constituents and their loss as polymers mixed with the heavy black pitch constituents of the residual tar.

As a result of separation of the light oil and dead oil components of the products of such petroleum oil pyrolysis from the residual tar, without polymerization or with materially reduced polymerization, a substantially pitch-free hydrocarbon material may be separated having a portion boiling within the range of from 210 to 350° C., which may contain from 5% to 30%, and higher, of monomeric unsaturated hydrocarbons readily polymerizable by heat.

The particular concentration of this heat polymerizable monomeric material obtained in a given case will depend upon the amount of polymerization produced in separating it from the residual tar, as well as upon such factors as the conditions of pyrolysis and the character of the petroleum oil pyrolyzed.

As previously stated, the above mentioned heat polymerizable monomeric material may be readily polymerized by heat to form valuable resins.

Polymerization may be effected by heating the total material separated from the residual tar sufficiently to polymerize the readily heat polymerizable monomers boiling within the range of from 210° to 350° C., but insufficiently to appreciably polymerize the heat polymerizable material contained in lower boiling ranges, such, for instance, as styrene and methyl styrene. This may be accomplished, for example, by heating with stirring for 4 hours at 200° C., followed by distillation under vacuum to isolate the resin.

It may be preferable, however, to first effect a separation by fractional distillation between light oil boiling below say 210° C. and dead oil boiling above say 210° C.

The heat polymerizable monomeric material boiling within the range of 210° to 350° C. is so readily polymerizable by heat, that, in the fractional distillation of the light oil from the dead oil, a portion of the monomeric material is usually unavoidably polymerized and remains as polymer dissolved in the other constituents of the dead oil after the light oil is taken off overhead.

The polymerization of the heat polymerizable unsaturated monomeric material in the separated dead oil may be effected by heating the dead oil with stirring, for example, for four hours at 200° C.

The resin thus produced, together with any resin produced during the separation of the light oil from the dead oil, may then be isolated by distillation under vacuum.

In the separation of lower boiling hydrocarbon material from the pitch constituents of residual tar by various methods, the oil separated may contain components boiling above 350° C. and there may be present heat polymerizable monomeric material boiling outside the range of from 210° C. and 350° C. together with the monomeric material boiling within that range. On polymerization therefore the resin may include polymers derived from monomers boiling outside the said range along with polymers derived from monomers boiling within the said range.

As hereinbefore stated, after polymerization the resin may be isolated by distillation in vacuum, which may be assisted by steam. The yield, melting point, and other characteristics of the resin will depend upon the extent to which the isolation has been carried, or, in other words, upon the proportion of associated oils left in the resin.

Exhaustive steam distillations of the resins obtained from the unsaturated monomeric material isolated from tar by the distillation or solvent extraction methods described herein have produced resins having melting points as high as from 185° C. to 200° C. and higher, cube in mercury, as determined by the method and apparatus described in A. S. T. M. Procedure D61-24, with the following modifications.

1. Mercury is employed in depth of 2½ inches instead of water.
2. The cube of resin is rigidly supported by clamping the hook upon which the resin is attached so that the top of the cube is 1 inch below the surface of the mercury.
3. A 1½ inch immersion thermometer is employed and is immersed to that depth.
4. The exact temperature at which the resin becomes visible at the surface of the mercury is recorded as the softening point of the resin.
5. The melting point of the resin is calculated from the softening point by the following formula.

Melting point ° C. = softening point ° C. ×1.25+2° C.

The melting point of the resins described in this specification is intended to mean melting point as determined by the above recited method, or by equivalent methods.

Lower melting point resins may be readily obtained in greater yields by less exhaustive removal of the associated oils, thus resins ranging from very soft to hard resins having high melting points may be obtained as desired.

It has been usually found that each 6% of associated oils left in the resin lowers the melting point about 10° C.

Heat resins having melting points of 120° C. have been readily produced in yields corresponding to 20 to 30% of the dead oil in the case of the tar distillate produced in accordance with the process described in copending application Serial No. 342,735 and resins of the same melting point have been obtained in yields as high as 60% of the dead oil in the case of dead oil separated from extract produced in the process described in application Serial No. 353,034.

The heat polymerizable unsaturated monomeric material is preferably in sufficient concentration in that portion of the hydrocarbon material separated from the residual tar which boils within the range of from 210° to 350° C. to produce on polymerization by heat a 120° C. melting-point resin in quantity equal to at least 10 percent of the hydrocarbon material boiling within the range from 210° C. to 350° C., and preferably at least 20 percent, or higher, but lower concentrations may be employed.

The color of the resins obtained may vary from yellow to dark brown.

Heat polymer resins produced from dead oil separated from residual tar by the distillation process described in said copending application, Serial No. 342,735, have shown a tendency to be lighter in color than those produced from dead oil obtained from the solvent extraction of tar with propane and butane as described in said copending application, Serial No. 353,034. Also, heat polymer resins produced from the lower boiling portions of the dead oil have shown a tendency to be lighter in color than heat polymer resins produced from the higher boiling portions, especially such a portion as that boiling in a dead oil cut taken from 180° C. to 210° C. under a vacuum equivalent to 20 mm. of mercury, absolute.

The following examples will serve to illustrate the preparation of resins from such unsaturated fractions by thermal polymerization methods.

*Example 1*

Approximately 1000 grams of dead oil derived from the rapid distillation of oil gas tar in accordance with the process described in said copending application, Serial No. 342,735, and subsequent separation of the distillate, was weighed into a 2-liter 3-necked flask equipped with a thermometer and a short reflux condenser. The oil was then slowly stirred and heated over a Bunsen burner at a liquid temperature of 200° C. (±10° C.) for a period of 4 hours.

At the conclusion of this period, the material was allowed to cool somewhat and was then transferred for distillation to a tared 2-liter flask equipped with a ground glass neck. The oil was accurately weighed at this point.

The flask was provided with means for measuring vapor temperatures, in addition to a condensing apparatus and means for providing a vacuum. Bumping during distillation was avoided by folding several folds of iron wire to such length that one end reached slightly into the neck of the flask while the other end rested on the bottom of the flask.

The pressure was reduced to 100 mm. Hg, absolute, and heat applied by means of a Bunsen burner. The distillation was continued at a pressure of 100 mm. Hg, absolute, until the vapor temperature reached 180° C. During this first stage of the distillation, care should be exercised to prevent crystallization of naphthalene, if present, such as by employing a condenser operating at elevated temperatures.

When the vapor temperature reached 180° C. at a pressure of 100 mm. Hg, absolute, the flame was lowered and the pressure gradually reduced to 20 mm. Hg, absolute, using care to avoid bumping. When a pressure equivalent to 20 mm. Hg, absolute, was reached, the pressure was maintained at that value, and the distillation continued until a vapor temperature of 195° C. was reached.

During the second stage, the condenser may be cooled by cold water, but care should be taken to avoid the solidification of anthracene, if present.

The distillation was conducted rapidly, 5 to 10 cc. of oil per minute being removed.

When a vapor temperature of 195° C. was reached, the source of heat was removed and air was permitted to enter the apparatus slowly until atmospheric balance was restored.

In the above operation the yield of resin was 29.3%, with an actual melting point of 128° C., which was calculated to be equivalent to a yield of 31.4% at a melting point of 120° C. The color of the resin was light brown.

A straight run A. S. T. M. distillation of 100 cc. of the original oil gave the following data:

| | | |
|---|---|---|
| First drop | °C | 194 |
| 5 cc | °C | 212 |
| 10 cc | °C | 223 |
| 20 cc | °C | 234.5 |
| 30 cc | °C | 242.5 |
| 50 cc | °C | 256.5 |
| 70 cc | °C | 283.0 |
| 90 cc | °C | 319.0 |
| Decomposition point | °C | 319.0 |
| Total distillate | cc | 87 |
| Density at 20° C | | 1.0107 |

As pointed out previously, the high boiling monomeric material derived from tar obtained in the pyrolysis of petroleum, by rapid distillation or solvent extraction methods may be polymerized to form resins of the type desired by the application of certain catalysts, either with or without the simultaneous, or otherwise, application of heat.

Catalysts such as mineral acids, for example, sulfuric acid, hydrogen chloride, and acids of phosphorus, or acid acting metallic halides or complexes of said halides, preferably organic solvent complexes, as for example, boron trifluoride, aluminum chloride, boron trifluoride-diethyl ether complex, boron trifluoride-dimethyl ether complex, boron trifluoride-phenyl ether complex, boron trifluoride-phenyl methyl ether complex, boron trifluoride-dioxan complex, boron trifluoride-toluene complex, corresponding aluminum chloride complexes, and the like, may be employed for this purpose.

The metallic halides and their complexes employed are characterized by their ability to hydrolyze in the presence of water to give an acid reaction and, hence, for convenience they may be termed acid acting metallic halides.

Though acid-acting catalysts are preferred, other catalysts may be employed if desired such, for example, as catalysts of the neutral surface type. Examples of such catalysts are activated clays, silica gel, activated carbon, and the like.

As an example of a convenient procedure for the production of resins of the type desired with the use of sulfuric acid as a catalyst, the following is given.

*Example 2*

A sample of the oil to be polymerized, say 500 cc., is poured into a two-liter 3-neck flask equipped with a thermometer and stirrer. To the oil is added 96% $H_2SO_4$ while agitating vigorously. The acid is added 1 cc. at a time and the temperature is not permitted to exceed 50° C. The addition of the acid is continued in this manner until no further temperature rise is noted. The amount of acid necessary to achieve this end has been found to be about 1%, by volume, of the oil present.

The oil then is diluted with approximately an equal volume of naphtha, toluene, or similar diluent, and the solution decanted into 500 cc. of warm water (approximately 60° C.), leaving the acid sludge behind.

After settling, the water layer is drawn off, and neutralization of the acid is accomplished by use of a 10% to 20% aqueous solution of sodium hydroxide. After washing with caustic, an additional water wash may be made. In either case, the resin solution is dried by filtration through a bed of a suitable drying agent, such as lime.

If desired, the diluent may be added before polymerization instead of after polymerization.

After neutralization and drying, the resin may be isolated from the unpolymerized oil by any desired method, or the resin may be concentrated therein by vacuum distillation, which may be assisted by steam. The melting point of the resin and the yield obtained will depend, among other things, upon the extent to which the resin has been removed from the unpolymerized oil.

A convenient procedure for the production of resins of the type desired by the polymerization of monomeric unsaturated material, derived from tar resulting from the pyrolysis of petroleum, with the use of metallic halide catalysts or metallic halide-organic solvent complex catalysts is illustrated in the following examples.

*Example 3*

A 10 gram portion of the selected catalyst is suspended in 300 cc. of benzene by stirring. A 300 cc. portion of the dead oil separated from distillate recovered from petroleum tar emulsion by flash distillation as described in said copending application, Serial No. 342,735, is added dropwise from a separatory funnel while maintaining the temperature of the reaction mass below 50° C. When the addition has been completed, the mass is stirred for a period of 2 hours and then neutralized with an aqueous solution of sodium hydroxide (10 to 20%). Stirring is continued for an additional hour.

Clay or any other desired filter aid then is added and the mass is filtered. The aqueous layer is separated and discarded, after which the treated material is washed with hot water until the washings are neutral to litmus. The treated material then is filtered through lime to remove water or otherwise dried, and the resin isolated by any desired method.

The unsaturated dead oil employed in the following example was extracted from petroleum tar emulsion, along with light oil, following the procedure described in copending application Serial Number 353,034. After separation of the light oil, the unsaturated dead oil was treated in the following manner.

*Example 4*

A 532.6 gram portion of this unsaturated dead oil was treated with 8 cc. of 66° Bé. $H_2SO_4$ according to the procedure described in Example 2. Toluene was added after polymerization. Approximately 42% of the dead oil was converted to resin having a melting point of 97° C. and a brown color. The end temperature of the distillation for the removal of oil from the resin was 192° C. and the end pressure was equivalent to 18 mm. of mercury, absolute. A total of 145.9 grams of oil was recovered. The calculated yield of resin having a melting point of 120° C. was 36.2.

As pointed out previously, the unsaturated dead oil employed for the preparation of resins of the type desired may be polymerized by (a) thermal means, (b) catalytic means, or (c) a combination of thermal and catalytic means. In the latter case, the processes may be carried out consecutively without the intermediate removal of resin, or the resin may be removed between successive treatments.

The unsaturated dead oil used in the following example was obtained from petroleum tar emulsion by the process of copending application Serial Number 342,735. After separation from light oil, it was treated to remove heat polymerizable unsaturates by heating at 200° C. for 4 hours, followed by removal of the heat polymer resin formed. It was then subjected to catalytic polymerization by the following method.

*Example 5*

A 500 gram portion of the said unsaturated dead oil was treated with 6 cc. of 66° Bé. $H_2SO_4$ according to the method described in Example 2. Naphtha was added after polymerization. Approximately 19% of the dead oil was converted to resin having a melting point of 88.2° C. and a light yellow brown color. The end temperature of the distillation for the removal of oil from the resin was 185° C., and the end pressure was equivalent to 20 mm. of mercury, absolute. A total of 407.9 grams of oil was recovered. The calculated yield of resin having a melting point of 120° C. was approximately 15%.

Examination of the monomeric unsaturated material and associated oil boiling within the range of from 210 and 350° C., described herein and the resins produced therefrom have shown that these materials are predominately aromatic.

Density determinations have indicated that the density at 25° C. of the resins obtained as described herein frequently falls within the approximate range of 1.12 to 1.20, with resins produced from dead oil from the solvent extraction of tar tending to be somewhat higher than those produced from dead oil from rapid tar distillation. The densities of the acid polymers tend to be somewhat lower than those of the heat polymers derived from the same unsaturated dead oil. Resins of this type having other densities may be employed, however.

The molecular weights of the resins produced as previously described necessarily vary with the melting point, which also varies with the presence of varying quantities of associated oil among other factors. Determinations of the Benzene Freezing Point Depression method have shown that such resins usually have molecular weights ranging from 308 to 758 over a range of melting points from 80.5° C. to 195° C. as determined by the cube in mercury method.

The fracture of the high melting point resins described herein may range from conchoidal to hackly. In general, the polymers are quite brittle.

The resins described herein, except those hardened by exhaustive steam distillation to a very high melting point, will usually react positively to the anthraquinone reaction, indicating the presence of anthracene, unless produced from lower boiling portions of the dead oil, which do not contain anthracene, or unless the anthracene has been otherwise removed.

The resins described herein usually will give but a slight diazo reaction, indicating the substantial absence of phenols.

The resins produced as above described usually will give negative Lieberman Storch reactions, indicating the absence of rosin acids.

Upon thermal decomposition of the resins of the type produced as above described herein, appreciable yields of material boiling within the range from 210° C. to 350° C. will be produced.

The heat polymer resins of the type produced as described herein usually are substantially completely soluble in carbon disulfide and benzol.

The quantity of resin insoluble in a mixture containing 50% petroleum ether and 50% pentane varies with the melting point of the resin, and may be of the order of 52% in the case of a thermal resin having a melting point of 95° C. and of the order of 80% in the case of a thermal resin having a melting point of approximately 183° C.

The quantity of resin of the type produced as described herein insoluble in a mixture of 50% petroleum ether and 50% pentane, but soluble in $CCl_4$, may be of the order of 50% for a thermal resin having a melting point of 95° C. and of the order of 74% in the case of a thermal resin having a melting point of 183° C.

The quantity of thermal resin insoluble in both the petroleum ether-pentane solution and $CCl_4$ usually is very low, ranging from a fraction of a percent to the neighborhood of 6 or 7%.

In general, catalytic polymers are much more soluble than heat polymers from the same unsaturated dead oil in all solvents except the alcohols.

The polymers from unsaturated dead oils obtained from the rapid distillation process described in copending application, Serial No. 342,735, tend to be more soluble in those solvents tried than similarly produced polymers from unsaturated dead oils obtained by the solvent extraction process described in copending application, Serial No. 353,034.

The free carbon content of resins of the type described usually is less than 5% and frequently less than 1%, or even 0.5%.

The above described characteristics of color, density, fracture, melting point, molecular weight, diazo reaction, Lieberman Storch reaction, anthraquinone reaction, thermal decomposition, and solubility are given for the purpose of illustration. It is not intended to imply necessarily that the resin produced as described above and employed herein may not depart somewhat from this illustrative description in one particular or more.

Furthermore, the addition of other materials to the heat polymerizable monomeric unsaturated materials prior to polymerization or to the resins after polymerization may, of course, modify the properties of the resins produced. Examples of such materials are other synthetic or natural resins, plasticizers, softeners, fillers, coloring materials, etc.

The resin employed may comprise mixed polymers of monomeric material boiling throughout the range of from 210° C. to 350° C. together if desired with polymers of monomers boiling outside of this range or resins may be employed which are produced from monomers boiling within a selected range or ranges within the range of from 210° to 350° C., for instance from separated material boiling above say 250° C. or say above 280° C.

The extracted oils may, for example, be distilled prior to polymerization to give a high boiling fraction and a low boiling fraction, which may be polymerized separately. In general, it has been found that the resins obtained from the low-boiling fraction, that is, the oils boiling below, say, 300–325° C., or even lower, usually are substantially lighter in color than the corresponding resins obtained from the high-boiling fraction. The use of such light colored resins generally is preferred for the application disclosed herein.

In separating such material, the dead oil containing the monomers may be fractionated by distillation under vacuum assisted by steam to avoid undue polymerization during the separation, or other methods of separation may be employed.

The resinous emulsion employed in accordance with the present invention is a resin-in-water emulsion.

In the preparation of an aqueous resin emulsion of the type employed herein, a mixture of water and resin is violently agitated with a view of maintaining one phase in a state of minute subdivision, the other phase coalescing to form the continuous phase. As the stability of the emulsion finally obtained is in large measure proportional to the degree of subdivision of the dispersed phase, it is apparent that efficient agitation should preferably be employed in order to insure the desired fineness of the dispersed phase.

Any suitable agitating or stirring device may be employed in forming the emulsion, and very satisfactory emulsions have been obtained by the use of the so-called colloid mills.

The emulsion may be formed by a dry process, a wet process, or a combination of the two, as described in my first-mentioned copending application.

In the dry process, the resin is reduced to a powder of the desired degree of fineness, after which it is emulsified by any suitable method and, for instance, at room temperature. In general, this type of emulsification requires the use of a very efficient stirring or agitating device in order to insure the production of an emulsion possessing the desired stability.

In the wet process, on the other hand, the resin is fused prior to or during the emulsification process, the mixture to be emulsified usually being maintained above the melting point of the particular resin employed during at least the major portion of the process. It is apparent that this method is especially suited to the preparation of emulsions at atmospheric pressures from resins having a melting or softening point below 100° C., that is, below the boiling point of water. However, by conducting the emulsification in a closed system, thus permitting the water employed to be maintained at any desired elevated temperature, without undue volatilization, resins derived from petroleum oil gas tar and possessing any desired softening point may be employed.

An alternative method for forming the emulsion comprises the addition of sufficient solvent to a high softening point resin to lower its melting point sufficiently to permit it to be fused at a temperature below 100° C. The added solvent may then be removed from the finished product, if desired, by steam distillation, or by other suitable methods.

In a combination of the two types of processes, the resin may be powdered and partially emulsified by means of the dry process, after which the emulsification may be completed by means of the wet process.

In general, resin emulsions prepared by the wet process, or by a combination of the dry and wet processes, have a tendency to be more stable than those prepared by the dry process alone.

In order to form the emulsion, a suitable emulsifying agent is associated with the water and the resin to be emulsified. Emulsifying agents may be divided into three classes, namely, chemical, colloidal, and solid.

Referring now to chemical emulsifying agents, the majority of those which may be used for the emulsification of resins of the type described are of the polar type, one end of the molecule being hydrophilic (water attractive) and the other end being lipophilic (oil attractive) or hydrophobic (water repelling). The lipophilic portion of the molecule frequently consists of an aliphatic or aromatic chain or ring, or combination thereof, while the hydrophilic part frequently consists of one or more polar groups, such as $-SO_3H$, $-SO_3Na$, $-COOH$, $-COOK$, $-COONH_4$, $-CONH_2$, $-CONHR$, in which R is an alkyl, aryl, or alkyl-aryl group, and the like.

In general, therefore, the chemical emulsifying agents may be represented by the general formula $$A_xB_n$$

where A represents an alkyl, aryl, or aralkyl chain, B represents a polar group which may be organic, inorganic, or organic-inorganic in nature, and $n$ represents any integer, usually from 1 to 3. However, it is not represented that all compounds satisfying this formula are emulsifying agents.

When emulsifying agents of this type are added to a resin-water mixture, and the whole is violently agitated by any suitable means, the emulsifying agent is absorbed at the interface and orients itself so that the lipophilic part is in the oil phase and the hydrophilic part is in the water phase. The relative activity and mass of the respective hydrophilic and lipophilic portions of the emulsifying agent used determines, in large measure, the tendency to form resin-in-water or water-in-resin type emulsions.

This is well illustrated by a consideration of the emulsifying action of salts of the higher fatty acids, such as palmitic, oleic, and stearic, upon a mixture of petroleum oil gas tar resin and water. The ammonium, potassium, sodium, and other monovalent salts of these acids have a pronounced hydrophilic character and thus act as emulsifying agents to form resin-in-water emulsions, and the use thereof is to be preferred over the salts of the di- and trivalent metals which tend to form water-in-resin emulsions.

In addition to the salts of the fatty acids previously mentioned, the salts of other members of this class, such as margaric, linoleic, and linolenic acids, also may be used with good results. Fatty acids derived from drying oils, such as linseed, tung, and perilla, in the form of salts also are excellent emulsifying agents, as well as the salts of naturally occurring acids, such as rosin acid (abietic acid). In general, it may be said that the salts of the higher molecular weight fatty acids, particularly those containing more than eight carbon atoms, make excellent emulsifying agents for the preparation of petroleum oil gas tar resin emulsions. Examples of particularly good emulsifying agents of this class include sodium oleate, ammonium laurate, ammonium stearate, potassium oleate, sodium laurate, potassium laurate, sodium stearate, and potassium stearate.

In addition to the use of the metallic derivatives of the fatty acids as emulsifying agents for this purpose, it has been found that other salts, such as the ammonium derivatives and the compounds formed by reacting basic organic ammonium compounds such as mono-, di-, or triethanolamine with the fatty acids, as well as other derivatives, such as the amides and amino derivatives, are eminently suited also. Quaternary ammonium salts, such as the reaction products of cetyl dimethyl amine with acids, such as hydrochloric acid are good emulsifying agents. The amine salts or esters of fatty acids of the type described, such as amino-stearin, are included within this class. All of the foregoing emulsifying agents are designated herein as "the salts of relatively high molecular weight organic acids."

Another class of active emulsifying agents comprises the sulfonic acid derivatives of hydrocarbons, such as alkyl sulfonic acids, as well as other compounds containing the sulfate or sulfonate group. Salts of these compounds, such as the sodium, potassium or ammonium salts, as well as the salts derived by reacting these compounds with organic bases, are particularly effective. Examples of such compounds are Turkey red oil (the sodium, potassium, or ammonium salt of the product obtained by treating castor oil with sulfuric acid), sodium lauryl sulfate, the sodium salts of the sulfonated alkyl naphthalenes, the sodium salts of sulfonated alkyl benzenes, toluenes, or xylenes, and the dioctyl ester of sodium sulfosuccinate.

Water-soluble sulfuric acid esters or derivatives of relatively high molecular weight aliphatic alcohols, as well as certain derivatives and salts thereof, for example, the alkali metal and ammonium salts, such as sodium lauryl sulfate, may be used as emulsifying agents for this type of emulsion also.

The foregoing compounds of sulfated or sulfonated hydrocarbons, and derivatives thereof are designated herein as "sulfonated hydrocarbon derivatives."

If desired, the emulsifying agents may be formed in situ. Thus, the lipophilic compound, for example, a fatty acid, such as oleic acid, may be dissolved in the resin and the compound forming the hydrophilic group, for example, the desired alkali, such as sodium hydroxide, may be dissolved in the water phase. Combining the two phases, results in the formation of the desired emulsifying agent, in this case sodium oleate. As the formation of the emulsifying agent takes place at the interface, the high concentration of this material at the time of formation, and at the location where it can exert its optimum effect, very materially assists in the preparation of stable emulsions.

Particularly stable aqueous petroleum oil gas tar resin emulsions which are relatively insensitive to changes in temperature may be prepared by the use of emulsifying agents comprising compounds prepared from the relatively high molecular weight decomposition products of albumen in combination with relatively high molecular weight saturated or unsaturated fatty acids, or their derivatives or substitution products. An example of these materials is the oleic-acid amino-compound of the decomposition products of albumen.

The use of esters of polyvalent alcohols and saturated or unsaturated relatively high molecular weight fatty acids, such esters still containing non-esterified alcoholic OH groups, in combination with the foregoing emulsifying agents, further serves to stabilize the emulsions prepared therewith, particularly with reference to decreasing their tendency to flocculate upon the addition of hard water, that is, water containing calcium or magnesium sulfates. Examples of such agents are glycerol monostearate, propylene glycol mono fatty acid esters, and the glycerol mono- and di-esters of cocoanut oil fatty acids. The acid constituent may consist, for example, of halogen, oxy, or amino compounds of saturated or unsaturated fatty acids, while the alcoholic constituent may consist of polyvalent alcohols or their derivatives.

To summarize, the chemical emulsifying agents which may be used for the preparation of aqueous emulsions of petroleum oil gas tar resins may be listed as follows:

1. Aromatic sulfonates and salts thereof.
2. Fatty alcohol sulfonates and salts thereof.
3. Fatty acid soaps.
4. Aromatic and aliphatic ether sulfonates and salts thereof.
5. Aliphatic sulfonates and salts thereof.
6. Polymeric sulfonates and salts thereof.
7. Polymeric alcohols.
8. Ester sulfonates.
9. Quaternary ammonium salts.

The first four classes listed are, in general, much better adapted to the preparation of stable aqueous emulsions of petroleum oil gas tar resins than the remainder of the classes listed.

Specific examples of the emulsifying agents which may be used for the preparation of aqueous emulsions of the type described herein are isopropyl naphthalene sodium sulfonate, dioctyl sodium sulfo succinate, butyl phenyl phenol sodium sulfonate, dibutyl phenyl phenol sodium sulfonate, sodium stearyl sulfate, alkyl phenylene sulfonate, sodium borosulfate of octadecenyl alcohol, $C_{13}$ alkyl benzene sulfonate, sodium sulfonate of acetynaphthone, naphthenic acid sulfonate, sodium oleate, and sodium myristate.

In certain cases, also, it may be found to be desirable to use two or more of the foregoing emulsifying agents for the preparation of resin emulsions of the kind described in order to impart certain desirable characteristics to the resulting product.

Referring now to the colloidal emulsifying agents, those which may be used for the preparation of petroleum oil gas tar resin emulsions include proteins, carbohydrates, and albuminous materials of high molecular weight. Examples of such compounds are egg albumen, glue, casein, starch, and gelatine. Although these molecules possess some polar characteristics, the major portion of their emulsifying action undoubtedly is due to the adsorption of a thin film of the emulsifying agent at the interface, thus forming a protective membrane which retards the coalescence of the globules of the dispersed phase.

An additional factor which materially assists in the stabilization of the resin-in-water emulsions is the large increase in the viscosity of the dispersion medium caused by the addition of even relatively small portions of emulsifying agents of this type. This assists in retarding the Brownian movement which normally tends to slowly coalesce the individual globules of the dispersed phase.

The colloidal emulsifying agents which may be used, either alone or, preferably, in conjunction with chemical emulsifying agents, for the emulsification of petroleum oil gas tar resins may be listed as follows:

1. Synthetic and natural gums
2. Casein derivatives
3. Colloidal clays
4. Albumen and derivatives
5. Lecithins and associated compounds
6. Starches and dextrins
7. Glues and gelatines Alkaline derivatives of casein are particularly desirable for this purpose.

Specific examples of desirable colloidal emulsifying agents are polymerized poly-aryl sulfonic acid, polymerized alkyl-aryl sulfonic ester, sodium sulfonate of lauryl collamide, seaweed alginate, methyl cellulose, and soybean lecithin.

Referring now to solid emulsifying agents, it has been pointed out previously that certain finely divided solids can be used as emulsifying agents for the preparation of aqueous resin emulsions of the type described herein. These materials exert their influence by distributing themselves at the interface. As the stabilization of the emulsion depends upon both phases wetting the solid surface, it is evident that the stability of the resulting emulsion is directly dependent upon the particle size of the desired emulsifying agent, as well as upon the amount of emulsifying agent employed. Examples of solid emulsifying agents which may be used for the preparation of aqueous petroleum oil gas tar resin emulsions are finely divided ferric hydroxide, finely divided arsenious sulfide, and finely ground silica. Silicious materials in general, such as clay, kieselguhr, bentonite, and the like, also may be employed for this purpose.

It is, of course, to be understood that any combination of the foregoing classes of emulsifying agents, namely, chemical, colloidal, and solid, may be employed to prepare petroleum oil gas tar resin emulsions having desirable physical properties.

The use of a wetting agent or detergent, such as dibasic acid sulfonates, with any of the chemical emulsifying agents previously described, gives particularly satisfactory results. Generally speaking, wetting agents or detergents act to reduce the surface tension of the respective phases to permit the dispersed phase to become more finely subdivided and thus enhance the stability of the system.

In addition, wetting agents may be used as emulsifying agents in conjunction with materials which act as protective colloids with particularly satisfactory results. Not only are the petroleum oil gas tar resin emulsions prepared in this manner more stable than the corresponding emulsions prepared without the use of protective colloids, but such emulsions may be prepared by the use of much smaller quantities of emulsifying agent than would be employed normally. Emulsions prepared by the use of wetting agents, or emulsifying agents, in conjunction with protective colloids, generally show less tendency to cream or stratify.

In general, desirable resin emulsions of the type described herein may be obtained by the use of one or more surface active agent, such as wetting agents, dispersing agents, emulsifying agents, and detergents, in conjunction with protective colloids. The use of sulfated or sulfonated compounds, or derivatives thereof, as the surface active agent or agents gives particularly desirable results.

The use of a mixture comprising an emulsifying agent, a wetting agent, and a protective colloid will be found to give emulsions possessing very good stability and other desirable properties.

Among the protective colloids which may be used for this purpose are bentonite, gelatin, casein, glue, natural gums, such as gum ghatti, gum tragacanth, gum arabic, and the like, dextrin, and similar materials, as well as derivatives and modifications of these materials.

The pH of the emulsion also has a very profound influence upon its stability. It has been found that for each emulsifying agent there exists a definite range of pH values within which the given emulsifying agent exerts its optimum stabilizing effect when used for the preparation of petroleum oil gas tar resin emulsions. Consequently, by the proper adjustment of the pH value of a given resin emulsion, an emulsion possessing unusual stability may be obtained.

The use of emulsifying agents and procedures of the foregoing character will in by far the larger number of cases result in the desired resin-in-water emulsions to the use of which in the coating of organic materials this invention more particularly relates.

The quantities of ingredients employed in preparing the emulsions to be used in accordance with this invention, namely, petroleum oil gas tar resin, emulsifying agent or agents, and water may be varied over very wide limits. In general, this will depend somewhat upon the adopted procedure of coating or impregnating the particular organic material, and upon the amount of resin which it is desired to associate with the material. In general, however, it has been found that the approximate practical upper limit for the concentration of resin in the finished emulsion is approximately 60 per cent by weight. The lower limit of the resin in the emulsion may be as low as desired, for example, 1 per cent or 2 per cent by weight.

The quantity of emulsifying agent rarely exceeds 20 per cent by weight of the resin employed; and in most cases, it will be found that 5 per cent to 10 per cent of the emulsifying agent, or less, is ample.

As pointed out in my first mentioned copending application, the emulsions can be further stabilized by the addition of materials which increase the viscosity of either of the phases, examples of such materials being sugars, albuminous materials, glues, gelatin, casein, and derivatives of resinous materials, such as the sodium salt of polymerized methacrylic acid, partially saponified polymerized methyl methacrylate, or methyl cellulose.

Among the various additives that may be incorporated in my petroleum oil gas tar resin emulsions, if desired, are the following: (1) other synthetic resins, such as resins prepared by the polymerization of other unsaturated hydrocarbons, vinyl chloride, vinyl acetate, acrylic acid and derivatives of acrylic acid, methacrylic acid, and derivatives of methacrylic acid, vinylidene compounds, unsaturated aldehydes, unsaturated ketones, as well as resins derived by the copolymerization of mixtures containing one or more of the foregoing; (2) derivatives of the foregoing resins, such as the sodium salt of polymerized methacrylic or acrylic acids; (3) natural resins, such as rosin, shellac, congo, dammar, kauri, elemi, pontianak, and chicle; (4) plasticizing agents, such as esters of phthalic acid phosphoric acid esters, chlorinated diphenyl, and the like; (5) pigments; (6) fillers, such as wood flour, fabric waste, cotton linters, and the like; (7) coloring agents, such as dyes, lakes, and the like; (8) decorative pigments, such as chitin extracts, mercurous chloride flakes, pearl essence, and the like; (9) asphalts, tars, still residues, and pitches; (10) waxes, (11) drying oils, either raw or bodied; (12) solvents; (13) cellulosic plastics such as cellulose nitrate and acetate and the cellulose ethers; (14) gums, such as gum arabic, gum tragacanth, and the like, (15) rubber, both natural and synthetic, elastomers in general, and derivatives thereof; and (16) miscellaneous materials, such as gelatin, casein, glue, and the like.

It will be understood, of course, that any desired combination of the foregoing types of additives may be employed, if desired. In certain cases, the added materials may take the place of the emulsifying agents normally employed, either wholly or in part.

In addition, the petroleum oil gas tar resin emulsions may be further modified for specific purposes by blending with a second emulsion, such as synthetic or natural rubber latices, or another resin emulsion.

As previously pointed out, difficulties have been encountered due to the very marked decrease in the mechanical properties of synthetic mineral fibers caused by the abrasion thereof.

In accordance with the present invention, such damage may be prevented by applying a coating of petroleum oil gas tar resin, suitably in the form of an aqueous resin emulsion, on the surface of the fibers, followed by the removal of water and other volatile components by suitable means, such as by heating.

The emulsion may contain other ingredients, as hereinbefore pointed out, although excellent results have been secured by the use of aqueous oil gas tar resin emulsions without the addition of any other ingredients.

Plasticizers, such as high-boiling hydrocarbon oils, alkyl phthalates, tricresyl phosphate, chlorinated diphenyls, and the like probably are the most desirable additives for resin emulsions of the type described due to the flexibility imparted to the coating subsequently obtained.

The fibers, either as individual fibers or in fabricated form, may be coated with the aqueous petroleum oil gas tar resin emulsion in any desired manner, for example, by spraying, dipping or flowing the aqueous resin emulsion upon the individual fibers or upon the finished batts, threads, fabrics, and the like.

The invention is of particular applicability in the treatment of glass fiber or mineral, rock, or slag wool batts for insulating purposes. As previously stated, these batts are prepared by forming a loose batt or felt of the desired shape from the fibers, and such batts depend for their insulating efficiency on the formation of dead air spaces or pockets within the interior of the batt by the meshed fibers of which it is constructed. Due to the large number of air spaces, and since air is an excellent insulating medium, the batts possess good insulating properties.

However, in storage, shipment and installation, the batts ordinarily are easily crushed, resulting in a marked decrease in the number and size of the air spaces or pockets present in a given unit, and hence the product suffers a serious loss of insulating efficiency.

Such damage can be prevented by applying a coating of petroleum oil gas tar resin to the fibers, suitably in the form of an aqueous resin emulsion, followed by the removal of the volatile constituents present by any suitable means. As a result, the fibers are coated with the resin, effectively protecting the fibers from abrasion.

In addition to the protection against abrasion, it has been found that insulating batts prepared from such coated fibers possess unusual resiliency, due, among other things, to the elastic nature of the coating which further tends to protect the material from deterioration, due to external mechanical stresses, and enables the mass to regain its original shape upon distortion.

As an example of the preparation of insulating batts, the fibers after being spun from a molten bath may be transferred to a suitable conveyor and matted or felted into the desired form by means of a stream of air, steam, or other gas. During this stage of the process, the fibers may be coated with a resin emulsion of the type described herein, by introducing the emulsion into the unit along with the stream of steam, air or other gas. The wet, coated fibers may then be passed through a furnace, or other heating device, or zone during which the volatile constituents are removed. As a result, the individual mineral fibers receive a coating of the resin, which effectively protects the fibers from mechanical injury.

The mineral fibers may, of course, be coated with the resinous emulsion at any stage of the process subsequent to the formation of the fibers and the water may be removed by any other means such as by a blast of heated air.

Mineral fibers which are to be used for other purposes, such as for the preparation of threads, fabrics, mats or other form of article, may be coated in a similar manner, or otherwise.

Textiles and other woven or formed articles prepared from mineral fibers may, if desired, be completely impregnated by means of an aqueous resin emulsion of the type described, resulting in articles in which the fabric is enclosed in a continuous resin coating. Such a product finds numerous uses in industry, for example, where it is desired to obtain a fabric which is impervious to the passage of gaseous or liquid products.

The quantity of resin applied can be varied over fairly wide limits in order to obtain any desired physical properties in the finished material.

After treating the inorganic material with the desired resin emulsion, the volatile materials may be removed in any desired manner, such as by the application of heat, or otherwise. Suitable methods for the application of heat comprise the use of ovens in which the treated material may be placed, or through which it may be passed continuously or otherwise as well as the use of infra red rays for this purpose, etc.

An alternative method for removing the water comprises the addition of a coagulating agent, such as methyl alcohol, barium chloride, alum, ethyl alcohol, or acetone, which serves to flocculate the emulsion and deposit the resin directly upon the surface of the material.

While any desired emulsifying agent may be used in the preparation of the petroleum oil gas tar resin emulsion, and any means for coagulating the dispersed resin may be employed, a suitable choice of emulsifying agent or coagulating means, or both, will have a considerable influence upon the physical appearance and properties of the finished product. For example, when ammonium salts such as ammonium caseinate or ammonium oleate are employed as emulsifying agents, the subsequent heat treatment serves to remove the volatile constituent ammonia, leaving the residue from the emulsifying agent firmly adhering to the material.

Similarly when alkali metal or ammonium salts, such as sodium caseinate, sodium oleate, or ammonium laurate, are employed as emulsifying agents, the use of a heavy metal salt, for example, barium chloride, as coagulant, results in the deposition of the corresponding heavy metal salt of the acidic portion of the emulsifying agent upon the surface of the material.

Sizing, such as a rosin size, or other ingredients may be incorporated with the aqueous petroleum oil gas tar resin emulsion prior to its application to the material, if desired, or it may be applied to the material separately, in which case it is preferably applied prior to the application of the resin emulsion. The proportion of petroleum oil gas tar resin and sizing or filling materials may be varied at will in order to produce a final sheet or other product having the desired physical properties.

The type of film obtained, when the aqueous petroleum oil gas tar resin emulsion is applied to the mineral fiber, which term includes the fabricated product, and the aqueous vehicle evaporated or otherwise removed, depends on the temperature to which the treated material is exposed, either after or during the evaporation or other removal of the vehicle. In the event the water is removed at a temperature below the softening point of the resin, the mineral fiber will be covered by a film of the resin comprising discrete particles. Such a covering is advantageous for many purposes, since it is relatively pervious.

The film comprising the discrete particles may be subsequently converted, if desired, into a continuous imprevious film by heating the treated material above the softening point of the resin sufficiently to cause the discrete particles to flow and weld together. Such a temperature may be furnished by an oven or drier, or by a heated roll, or a calender.

A similar continuous film of resin is also obtained when the aqueous vehicle is removed from the treated material at a temperature above the softening point of the resin.

A further method of obtaining a continuous resin film comprises the application of a petroleum oil gas tar resin emulsion containing a solvent having a boiling point above that of water, followed by the removal of the water present, such as by the application of heat. The solvent then exerts a leveling action upon the resinous material present on the surface of the fiber, resulting in the production of a continuous resinous coating. The solvent may be removed subsequently, if desired, such as by the application of heat.

It should be emphasized, however that the quantity of resinous coating usually applied to a glass or mineral wool insulating batt or blanket may be considerably less than that required to completely coat each individual fiber. The resin serves to coat a portion of the fibers together at their interstices and to at least partially coat the majority of the fibers.

Thus, for example, excellent results are obtained when the fibrous material is coated with less than 10% and even less than 5%, by weight, of resin.

The process is further illustrated by means of the following examples:

Example 1

A quantity of loose mineral wool fibers was coated with a resin emulsion of the type described herein and containing approximately 50% of resin, after which they were heated for a period of 10 minutes at a temperature of 140° C. After cooling, the individual glass fibers were found to be coated with a layer of resin, effectually protecting the fibers from exterior mechanical abrasion.

The coated fibers were subsequently shaped to form an insulating batt, which was relatively very resilient and resistant to deformation.

Example 2

A glass fiber insulating batt is dipped into an aqueous petroleum oil gas tar resin emulsion containing 25% oil gas tar resin, after which the coated batt is permitted to drain for a period of 15 minutes and then heated for a period of 30 minutes at a temperature of 140° C. Upon cooling, the individual fibers are found to be covered with a discontinuous coating of petroleum oil gas tar resin, and certain of the fibers are cemented together at those points at which they came in contact with each other. The insulating batt is relatively very resilient and resists deformation strongly.

Example 3

A piece of a woven glass fiber fabric is sprayed with an aqueous petroleum oil gas tar resin emulsion containing 25% resin, after which it is heated to a temperature of 140° C. for a period of 15 minutes. Upon cooling, the fabric is found to be coated with a layer of resin.

Example 4

A piece of loosely woven glass fiber fabric is dipped in a petroleum oil gas tar resin emulsion containing 50% resin, after which it is baked for a period of 15 minutes at a temperature of 140° C. A coated fabric in which the interstices are filled with resin is obtained.

Considerable modification is possible in the selection of the petroleum oil gas tar resin emulsion employed, as well as in the methods of applying the same to the mineral fibers, without departing from the essential features of the invention.

From the foregoing, it will be seen that my fibrous masses are extremely porous in character, which accounts for their high heat insulating characteristics.

It will also be seen that the resin when applied forms hardly more than a thin film on the surface of the individual fibers, if indeed each fiber is coated. Such film on the fibers may be continuous or discontinuous. In masses of the character described, the surface covered by the resin is frequently of a very low order, such as, for example, from 5 to 10%. In such instances, the resin particles on the fibers act as shields and/or bumpers, and when occurring at a point of fiber contact, act as cementing agent.

My coated mineral fiber as distinguished from other types of materials containing mineral fiber, such as floor mastic or molding compositions, may be said to have an open fiber structure, that is, a structure in which the spaces between the fibers are not filled with a binder, resin, or other material, but are open.

Furthermore, my new fibrous masses may be distinguished from floor mastic and molding compositions in the disposition of the resin on the fiber. In the former two cases, the resin is continuous from fiber to fiber, whereas in my case, when the resin is continuous on the fiber it has an open structure similar to the fiber, and thus preserves the original open structure of the fiber. When my resin occurs discontinuously on the fiber, the fiber is still open structure.

In the specification and in the claims, the term "readily heat polymerizable" or its equivalent is intended to mean that the material so defined may be polymerized to a resin by heating with stirring for four hours at 200° C.

Having described my invention, it is to be understood that the foregoing is by way of illustration. Therefore, additions, substitutions, modifications, and changes may be made therein without departing from the spirit of the invention, which is intended to be limited only as required by the prior art.

I claim:

1. A mineral fiber mass of open structure having a coating thereon comprising a hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C.

2. A synthetic mineral fiber mass of open structure having a coating thereon comprising a hydrocarbon resin polymer produced by treating with sulfuric acid a hydrocarbon oil which has been physically separated from tar produced in the vapor phase pyrolysis of petroleum oil and which is free from and of greater volatility than the pitch of said tar, said hydrocarbon oil containing in addition to hydrocarbons boiling between 210° C. and 350° C. which are not polymerizable by the application to said oil of heat alone but which are polymerizable to catalytic resin polymer by treating said oil with sulfuric acid, other hydrocarbons boiling between 210° C. and 350° C. which are polymerizable to catalytic resin polymer by treating said oil with sulfuric acid but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C.

3. A synthetic mineral fiber mass of open structure having a coating thereon comprising a hydrocarbon resin polymer produced by treating with activated clay a hydrocarbon oil which has been physically separated from tar produced in the vapor phase pyrolysis of petroleum oil and which is free from and of greater volatility than the pitch of said tar, said hydrocarbon oil containing in addition to hydrocarbons boiling between 210° C. and 350° C. which are not polymerizable by the application to said oil of heat alone but which are polymerizable to catalytic resin polymer by treating said oil with activated clay, other hydrocarbons boiling between 210° C. and 350° C. which are polymerizable to catalytic resin polymer by treating said oil with activated clay but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C.

4. A synthetic mineral fiber mass of open structure having a coating thereon comprising a hydrocarbon resin polymer produced by the application of heat to a hydrocarbon oil which has been physically separated from tar produced in the vapor phase pyrolysis of petroleum oil and which is free from and of greater volatility than the pitch of said tar, said hydrocarbon oil containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C.

5. An insulating batt comprising felted synthetic mineral fiber coated with a hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C.

6. A gas impervious fabric comprising woven synthetic mineral fiber impregnated with a hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C.

7. The method of making coated mineral fiber which comprises bringing said fiber into contact with a dispersion in a liquid of a hydrocarbon resin, and thereafter removing the liquid therefrom to leave said resin deposited on said mineral fiber; said resin being a hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C.

8. The method of making coated synthetic mineral fiber which comprises bringing said fiber into contact with an aqueous emulsion of a hydrocarbon resin, and thereafter removing the water therefrom to leave said resin deposited on said mineral fiber; said resin being a hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C.

FRANK J. SODAY.